Oct. 4, 1966  J. M. LAPEYRE  3,276,878
PROCESS FOR PEELING PRE-COOKED SHRIMP
Original Filed Sept. 27, 1960  4 Sheets-Sheet 1
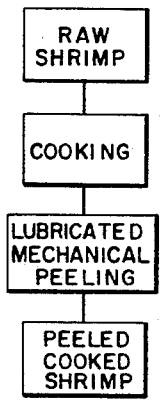
FIG. I.
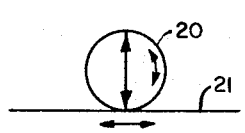
FIG. 2.
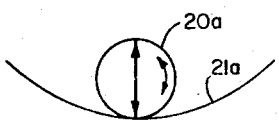
FIG. 3.
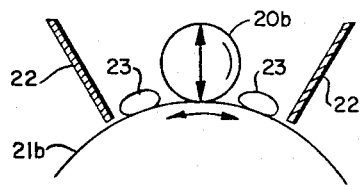
FIG. 4.
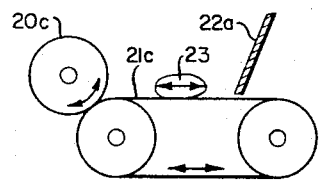
FIG. 5.
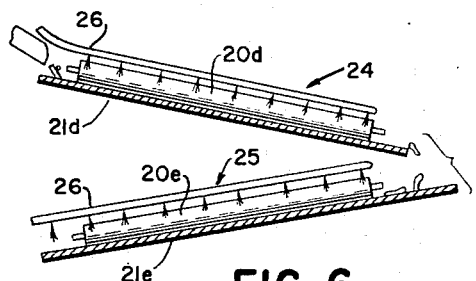
FIG. 6.
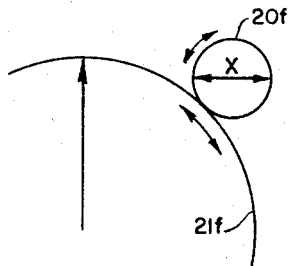
FIG. 7.
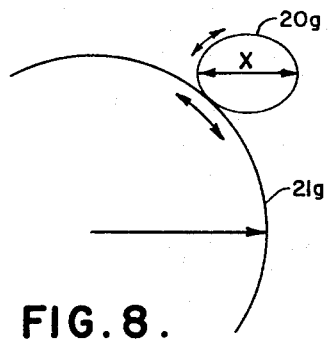
FIG. 8.
INVENTOR
James M. Lapeyre
BY Wilkinson, Mawhinney & Theibault
ATTORNEY Oct. 4, 1966 J. M. LAPEYRE 3,276,878
PROCESS FOR PEELING PRE-COOKED SHRIMP
Original Filed Sept. 27, 1960
4 Sheets-Sheet 2

INVENTOR
James M. Lapeyre

BY
Wilkinson, Mawhinney & Theibault
ATTORNEY

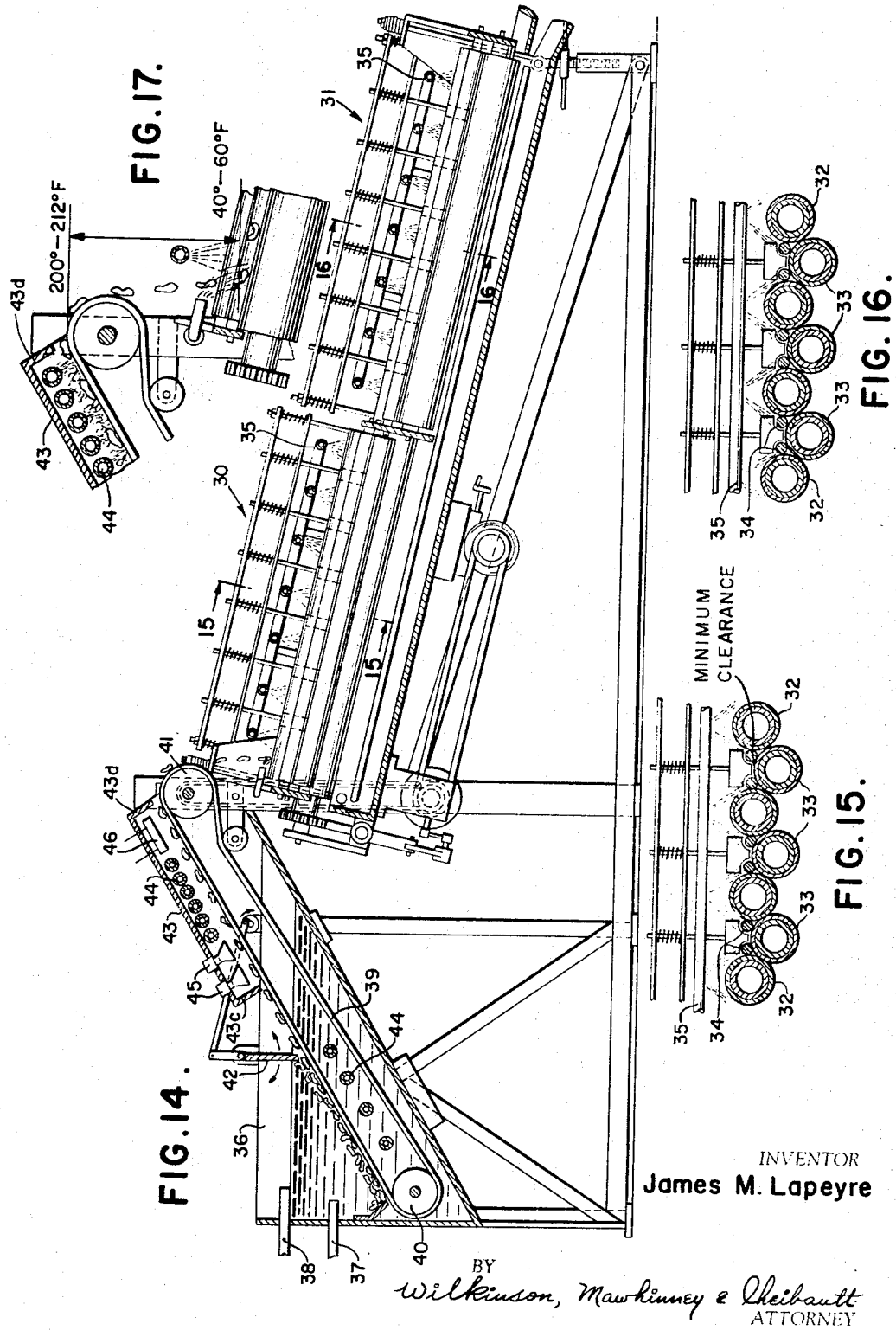

Oct. 4, 1966  J. M. LAPEYRE  3,276,878
PROCESS FOR PEELING PRE-COOKED SHRIMP
Original Filed Sept. 27, 1960  4 Sheets-Sheet 4

INVENTOR
James M. Lapeyre

BY Wilkinson, Mawhinney & Theibautt
ATTORNEY

United States Patent Office 3,276,878
Patented Oct. 4, 1966

3,276,878
PROCESS FOR PEELING PRE-COOKED SHRIMP
James M. Lapeyre, New Orleans, La., assignor, by mesne assignments, to The Laitram Corporation, New Orleans, La., a corporation of Louisiana
Continuation of application Ser. No. 242,029, Nov. 1, 1962, which is a division of application Ser. No. 58,837, Sept. 27, 1960. This application Sept. 24, 1965, Ser. No. 493,616
2 Claims. (Cl. 99—111)

The present invention relates to a Process for Peeling Pre-Cooked Shrimp.

This application is a continuation of my co-pending application, Serial No. 242,029, filed November 1, 1962, now abandoned, which is a division of Serial No. 58,837, filed September 27, 1960, now abandoned.

Mechanical peeling machines such as the machines described in United States Patent No. 2,537,355, granted January 29, 1951 and United States Patent No. 2,574,044, granted November 6, 1951 have been successful and commercially accepted in the peeling of shrimp.

However, I have found that in the peeling of some species of shrimp, the water employed in lubricating the peeling rolls and for advancing the shrimp down the peeling channels causes some of the color on the surface of the shrimp meat to be lost due to the washing away of the naturally pigmented material or chromatophores.

In addition to the above-mentioned washing action I have also found that boiling peeled shrimp meats causes a similar washing away of the naturally pigmented material which is preserved when the shrimp are cooked while still protected by their shells.

I have also found that shrimp cooked after peeling tend to curl or form a circle thereby losing their characteristic crescent shape which is important from a marketing standpoint in some areas such as Scandinavia.

I have also found that by cooking the shrimp just prior to peeling that a better yield of cooked, peeled shrimp in toto fed to the machine and not merely cooked shrimp which are subsequently peeled, comparing the amount of the recovery of these shrimp with the recovery of raw peeled shrimp which are not subsequently cooked is usually obtained with a better color in the finally peeled shrimp, with less broken shrimp and with a higher percentage of shrimp containing the telson or tail section meat attached. In addition the characteristic crescent shape is preserved.

The pre-cooking of the shrimp meat fixes the chromatophores with respect to the shrimp meat during the coagulating or firming up of the shrimp meat so that the water sprays on the machine have very little effect on paling or bleaching of the shrimp during the peeling step of the process.

I have also found that by introducing the shrimp into the peeling channels immediately after cooking and while the shrimp is still in a temperature range as close as practically possible to 212° F. that upon dropping the shrimp at this elevated temperature into a peeling machine of the character referred to above which employs sprays and peeling rolls whose temperature range varies from 40° to 60° F. that there appears a fluid or moisture zone between the cooked shrimp meat and the outer shell. The thermal treatment of the cooking step of my process induces and promotes the formation of the accumulation of fluid between the cooked meat and the outer shell. I have found that the shrimp are peeled with greater facility when this fluid exists between the shrimp meat and shell.

Cooperating with the shrimp which has been cooked and which contains the fluid between the cooked meat and shell are certain modifications in the existing and known shrimp peeling machines which may be characterized by the use of smooth or specular surface insert rolls in both the upper and lower sections of the machine which insert rolls in the upper section have a slightly reduced diameter over the rolls of the lower section. I have also found that prior to introducing the cooked shrimp into the peeling machine that if the pressure fingers carried by the finger frames as shown in U.S. Patent No. 2,537,355 are set to a minimum clearance that is the clearance between the pressure fingers and the peeling rolls, peeling of a better character is obtained.

By pre-cooking the shrimp prior to peeling I have also been able to increase the pressure and volume of water spray without the attendant loss of pigmentation color in the finished product which permits the rolls to be kept clean and the shrimp to be advanced through the machine at a slightly more rapid rate which will increase the machine production per hour since the water is employed as a conveying medium.

While heretofore raw shrimp have been machine peeled commercially and economically, pre-cooked or pre-treated shrimp have so far resisted successful mechanical peeling, and a primary object of the invention is to provide a process for overcoming this resistance and to enable the bulk feeding and mechanical peeling of large quantities of shrimp; the invention thus supplanting the old practice of hand peeling which was laborious, expensive and oftentimes wasteful.

It is a further object of the present invention to subject pre-cooked shrimp to a nip which may comprise two moving surfaces, at least one of which is curvilinear in nature and at least one of which is in motion and in which the curvilinear surface is defined by a series of interconnected arcs forming a closed geometrical figure, the major axis of the cross-section of which is less than 14.22 mm. (%6 inch).

The step of the pre-cooking to which the shrimp are initially subjected prior to introducing the shrimp to the peeling nip is to place shrimp in a fluid and cook the same for a period of up to 15 minutes. While temperature and time are both variables and time can be reduced by increasing the temperature or the temperature lowered and the time increased to effect cooking, I do not restrict myself to a specific temperature and time. The action which takes place in the pre-cooking may more properly be described as firming of the shrimp meat. The firming of the shrimp meat is accomplished by the application of heat. The source of heat may be hot water, or other liquid media, steam, sonics, or radio frequency energy. It may be characterized as a loosening of the shell or integument from the meat which can take place either by expansion of the shell or integument or the shrinkage and compaction of the meat or both.

The coagulation of the meat caused by cooking is probably accompanied by some change in the composition of the meat. The shells are also affected by the cooking becoming somewhat dry and roughened with reduced pliability and apparent increase in brittleness.

Since there are numerous species and sizes of shrimp, some of which have thicker shells than others, the cooking time would, of course, vary with the species of shrimp being processed. Other variables which can affect the cooking time are, the degree of freshness and the stages of maturity and molting period. The nature of the protein and the ratio of solids to water appears to vary among some of the species of shrimp. This variance will affect cooking times and/or temperatures. In addition, the size of the shrimp used has a considerable effect on the cooking time.

It is a further object of the present invention to provide the process wherein the shrimp are initially subjected to a cooking operation until there is sufficient firming up of the meat and loosening and/or separation of the outer surface of the shrimp meat and the inner surface of the shrimp shell after which the thus cooked shrimp is subjected to the pinch and/or pull of a bight or nip defined between two relatively moving surfaces, at least one of which is curvilinear and which curvilinear surface has a major axis of a predetermined length and thereafter subjecting the shrimp to a second peeling nip defined between two relatively moving surfaces, at least one of which is curvilinear and defines a geometrical figure in cross-section, the major axis of which is greater than that of the first curvilinear surface.

The over-all length of the first nip and of the second nip just described are at the choice of the operator and may be of any sensible length. Where long lengths are chosen such as would take excessive plant room, the over-all length of each nip may be physically composed of two or more sections suitably arranged to utilize floor space to a maximum.

By relative movement I mean the movement between surfaces which is caused to constantly bring a new portion of at least one surface into nip forming relationship with the other surfaces. Preferably in practice I prefer to so move the surfaces as to constantly bring a new portion of each surface into nip forming relationship with the other surface.

Another object of the present invention is to provide a process for peeling shrimp in which after cooking the shrimp and while the shrimp are being subjected to the peeling nip, sufficient water is furnished to the nip to facilitate removal of the shell and to cleanse the shrimp meat and to also advance the shrimp along the peeling nip.

The water which is fed to the process will be utilized to control the rate of advance of the shrimp along the length of the nip. For this purpose, it may be constantly or intermittently applied and in various volumes, depending upon the speed of travel desired. The water may enter at the starting end or at other points along the length of the nip and may, if desired, be brought directly to bear upon the shrimp being peeled.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a flow chart of the process of the present invention.

FIGURE 2 is a diagrammatic view of one form of apparatus for removing the hulls from cooked shrimp.

FIGURE 3 is a similar view of a modified form of apparatus for practicing a peeling step of the process of the present invention.

FIGURE 4 is a cross-sectional view showing a further modified form of machine for performing a peeling step of the instant process.

FIGURE 5 is a similar view illustrating a still further modified form of machine for performing a peeling step of the present invention.

FIGURE 6 is a longitudinal sectional view of a two-stage mechanical arrangement of peeling nips for performing peeling steps of the instant process.

FIGURE 7 is a section through the peeling nip of a machine for practicing a peeling step of the instant process wherein one of the curvilinear surfaces is a circle.

FIGURE 8 is a view similar to FIGURE 7 in which one of the curvilinear surfaces is elliptical in cross-section.

FIGURE 14 is a side elevational view of a shrimp peeling machine and feed tank arrangement forming a part of the apparatus of my invention having parts broken away and parts shown in section.

FIGURE 15 is a section taken on the line 15—15 in FIGURE 14.

FIGURE 16 is a section taken on the line 16—16 in FIGURE 14.

FIGURE 17 is a fragmentary side elevational view with parts broken away and parts shown in section of the feed means for feeding cooked shrimp into the peeling machine.

Figure 9:
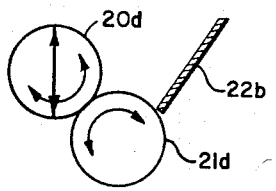
FIGURE 9 is a view similar to FIGURE 5 of a further modified form of apparatus for practicing the process.

Referring now to the drawings and for the present to FIGURE 1, the steps of the process of the present invention comprise introducing or subjecting raw shrimp either as caught or with their heads removed to a cooking step which step is best defined as subjecting the raw shrimp to a physical change in which the shrimp meat is firmed which will casue a reduction in coherent contact area between the outer surface of the shrimp meat and the inner surface of the shell of the shrimp which by virtue of reduction of surface coherence area between meat and shell will render the shrimp easier to peel.

The coagulation of the protein or the firming of the shrimp meat takes place by placing the shrimp in boiling water for a time period of up to 15 minutes depending upon shrimp species and shrimp size and age out of the water. I do not restrict myself to the use of boiling water alone or for any given time period since any application of heat to the shrimp which will cause coagulation of the protein and firming of the meat and which will loosen the contact of the shrimp meat with the shrimp shell by either shrinkage of the meat or expansion of the shell or both would meet the requirements of this step of my process.

The peeling step of this process is performed by two surfaces, at least one of which is curvilinear and at least one of which is in motion. In the form of peeling nip illustrated in FIGURE 2, 20 designates a curvilinear surface whose geometrical configuration is that of a circle and whose diameter must be less than 76.20 mm. (3 inches). A surface or roll having this diameter cooperating with the second surface 21 will provide the pinching action necessary to eject the cooked shrimp meat from the shell.

Referring now to FIGURE 3, the peeling nip is defined between a roll or movable curvilinear surface 20$^a$ having a diameter less than 76.20 mm. which cooperates with a second curvilinear surface 21$^a$ having a diameter substantially greater than the diameter 76.20 mm.

In the form illustrated in FIGURE 3, the surface 21$^a$ is a concave surface.

In FIGURE 4, the curvilinear surface 20$^b$ having the diameter less than 76.20 mm. cooperates with surface 21$^b$ which in the form illustrated is a convex surface. Side walls or boards 22 may be employed to confine or restrict the movement of shrimp 23 between the surfaces and depending upon modification may be movable or stationary.

FIGURE 5 illustrates the cooperative relationship between the curvilinear surface 20$^c$ and the surface 21$^c$. The board 22$^a$ restricts the movement of the shrimp away from the nip defined between the surface 20$^c$ and 21$^c$.

Referring now to FIGURE 6, there is shown two peeling sections 24 and 25 in which the diameter of the roll or curvilinear surface 20$^d$ in the upper section 24 is smaller than the diameter of the curvilinear or peeling surface 20$^e$ in the lower section 25.

These sections may be placed on inclines to induce the movement of the shrimp along the peeling nips and the peeling surfaces are also supplied with water from water jet pipes 26 positioned above the peeling sections to promote the progress of the shrimp along the peeling nips.

Referring now to FIGURES 7 and 8, while I have referred to one of the curvilinear surfaces as having a diameter, it will be understood from viewing FIGURES 7 and 8 that the requirement of one of these curvilinear peeling surface would be met by any peeling roll, the cross-section of which defines a curvilinear surface which is a series of interconnected arcs forming a closed geometrical figure, the major axis of which is less than 76.20 mm. (3 inches).

FIGURE 7 shows a circle or cylinder 20$^f$ in which the major axis of the circle X is the diameter of the circle whereas FIGURE 8 shows a curvilinear surface 20$^g$ which is elliptical in cross-section whose major axis is less than 76.20 mm. (3 inches).

I have found in all forms of the peeling nip illustrated herein that the surface of the members defining the peeling nip must be of a specular or fine finish being smooth and relatively non-porous.

By "specular" is meant that the larger portion of the over-all surface is specular as distinguished from the diffuse surfaces such as are achieved by sand blasting or the like. The specular surface contemplated by me may, however, embody striations or markings such as long scratches and, indeed I have found that such markings, particularly scratches running in the general direction of the longitudinal axis of the roll, may improve the over-all efficiency.

In FIGURES 10–13 where peeling is effected by continuously rotating rolls working in cooperation with oscillating surfaces the rolls may be spirally marked or grooved so as to assist, while still peeling, to advance the shrimp in the desired direction longitudinally along the nip.

I have found also that the best results of the peeling step or steps of the process are obtained where one of the surfaces of the peeling nip is a hard surface, for instance, metallic, and the other surface is a resilient surface relatively compressible with respect to metal. Exception to the use of a resilient surface is where the rolls and surfaces are spaced apart as in FIGURES 10–13.

For instance, the reference to FIGURES 2 through 6, inclusive, the circular cross-section rolls 20 may be of metal and the cooperating elements of the nips 21 of a resilient rubber or plastic.

In practicing the process the members or rolls 20 and their complemental peeling members 21 are oscillated except as shown in FIGURES 10–13, as indicated by the arrows, to bring the shrimp to the nips between the same. Due to the curvilinear forms of one or both members progressively narrowing throats precede the nips which thus exert squeezing pressure on the shrimp, gradually collapsing the shells and expelling the meat, the shells being finally flattened and pulled through the nips to the opposite sides of the members, thus effecting a separation of shells and shrimp meats, which later are rejected at the throats.

The removed shells are collected separately from the recovered meats. Apparatus according to the invention will embody the peeling members in sufficient numbers and arrangements to afford desired peeling capacity. Suitable mechanical drive mechanism may be employed to oscillate and/or rotate the members. Water or liquid will be supplied to the surfaces and/or nips to cleanse the surfaces of the members from foreign matter.

I have been unable to ascertain with any exactitude the reasons why the conditions above described are so notably efficacious in the peeling of cooked shimp, but I have found that when these conditions are followed the results obtained are very superior in respect of efficiency of peeling and quality of the final product.

Referring to FIGURE 9 two oscillating rolls 20$^d$ and 21$^d$ form a nip. A baffle member 22$^b$ cooperates with the rolls to define a channel wherein the shrimp are contained during peeling.

Figure 10:
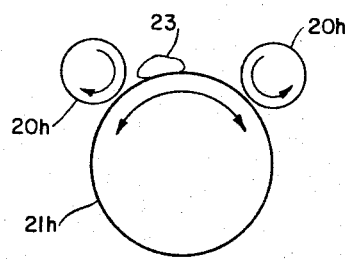
FIGURE 10 is a diagrammatic view of a modified form of peeling device constructed in accordance with the invention.

FIGURE 10 is an embodiment of the invention wherein constant directional rotary rolls 20$^h$ are employed in spaced relation from a shrimp support surface 21$^h$. The surface 21$^h$ may be oscillated as shown by the arrows while the rolls 20$^h$ are rotated continuously in one direction. The rotational speed (r.p.m.) of the rolls 20$^h$ may be controlled independently of the rate of reciprocation of the shrimp support surface 21$^h$ to obtain maximum peeling efficiency depending upon age, size and species of the shrimp being peeled.

Figure 11:
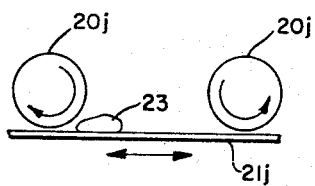
FIGURE 11 is a diagrammatic view similar to FIGURE 10 of a modified form of the invention.

FIGURE 11 is an embodiment in which constant directional rolls 20$^j$ are spaced slightly out of contact with the shrimp supporting surface 21$^j$ which is substantially flat and which is reciprocated.

Figure 12:
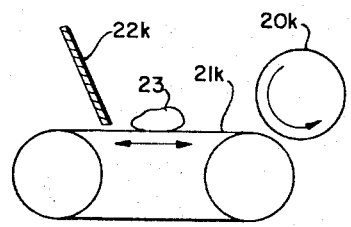
FIGURE 12 is a diagrammatic view of a further modification.

FIGURE 12 shows another embodiment in which a continuous rotating roll 20$^k$ is spaced from a reciprocating shrimp supporting surface 21$^k$ which is an endless belt carried by a pair of spaced-apart rolls. A member 22$^k$ acts to confine the shrimp to the peeling area.

Figure 13:
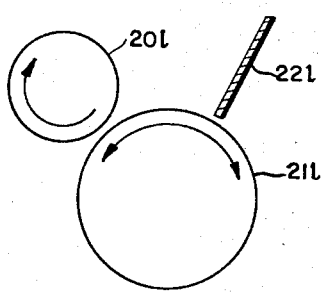
FIGURE 13 is a diagrammatic view of a still further modification of apparatus for practicing the present invention.

FIGURE 13 shows another embodiment in which a continuous rotating roll 20$^l$ is spaced from a reciprocating shrimp support surface in the form of an oscillating roll 21$^l$. A baffle member 22$^l$ defines the channel.

Referring now to FIGURES 14 through 17, inclusive, a peeling machine is shown as having an upper section 30 and a lower section 31 constructed in accordance with the teachings of my prior patents above identified which define peeling channels composed of oscillating rolls 32, 33 with insert rolls 34. Water spray pipes 35 are provided over the channels positioned to direct their water spray down onto the channels and over the surfaces of the peeling rolls and insert rolls.

The diameter of the insert rolls of the upper section 30 is slightly less than the diameter of the insert rolls of the lower section 31. By way of example, the diameter of the insert rolls in the upper section 30 are 7/16 inch while the diameter of the insert rolls in the lower section 31 are 9/16 inch.

A shrimp feed tank 36 is shown at the left-hand end of FIGURE 14, which feed tank 36 has a water supply pipe 37, and an overflow pipe 38 for maintaining the desired level of liquid in the feed tank 36. Mounted within the tank 36 is a mat-type or metallic mesh conveyor 39 which passes about rolls 40 and 41. An oscillated feed paddle 42 controls the rate of feed of shrimp onto the conveyor loading into the machine. Shrimp in the bulk in a raw state with shells on are dumped into the feed tank between the feed paddle 42 and the rear wall of the tank.

Lying between the feed paddle and the upper roll 41 of the conveying member 39 I have provided a hood structure 43 into which I have installed heating elements 44 in the form of perforated steam pipes 44, infra-red lamps 45 and banks of resistors or radio frequency heating units 46. The hood 43 confines the heat directing the same upon shrimp carried by the conveyor 39 and depending upon the species of shrimp the heat necessary to effect a cooking of the shrimp is provided by the heating elements described.

The heating elements 44, 45 and 46 may be employed individually or seriatim in the tank shown in FIGURE 14 wherein the bath of water in the tank 36 is heated to a pre-cooking temperature of the order of the boiling point or somewhat less, and the shrimp on the conveyor 39 as they pass beneath the hood 43 are subjected in turn to the rays from the infra-red lamps 45, to live steam issuing from the perforations in the pipes 44 housed within the hood, and to the action of radio frequency heating units 46.

Now turning our attention to FIGURE 17, it will be noted that the shrimp, which have been cooked, for instance by steam emitted from the steam pipes 44 and which are at a temperature of a range from 200°–212° F., are introduced immediately while at the elevated temperature onto the peeling rolls of the upper section of the peeling machine. The temperature of the rolls of the upper section and the water spray being played thereon by the water sprays 35 is of a temperature range of the order of 40°–70° F. depending on temperature of city or well supply. This temperature drop as far as I have been able to ascertain materially assists in the formation of the fluid between the cooked shrimp meat and the outer shell which is to be removed by the peeling machine.

How this is effected and the scientific reasons therefor I will not attempt to explain. I have noticed however that repeatedly the desired result is obtained, namely, the formation of the fluid between the shrimp meat and the shell and regardless of the physical explanation of why such result is obtained, I have disclosed the structure capable of producing such result.

Figure 18:
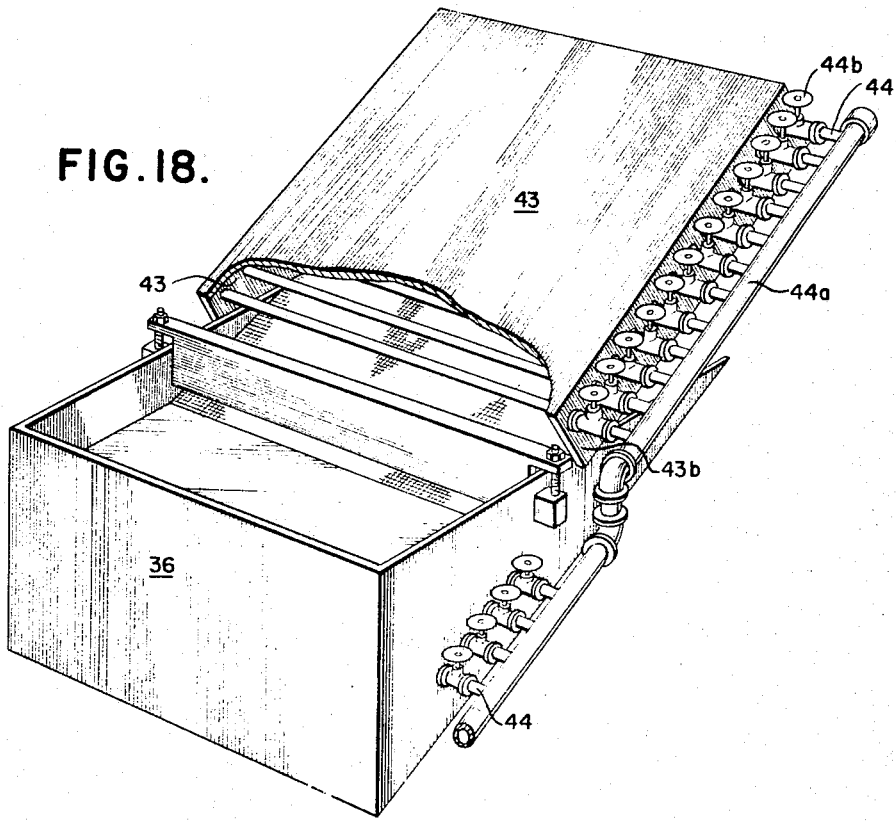
FIGURE 18 is a perspective view of a shrimp feeding tank and conveyor containing a steam cooking hood thereon in accordance with the present invention.
Figure 19:
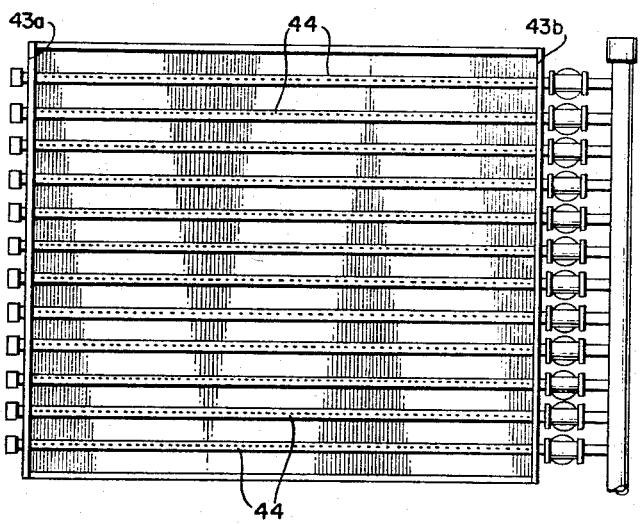
FIGURE 19 is a bottom plan view of the steam cooking hood for the shrimp feeding conveyor constructed in accordance with the present invention.

The feed tank 36 as shown in FIGURE 18 may also be provided with perforated steam pipes 44 whereby the cooking may be effected in the tank and receptacle prior to the carrying of the shrimp up the conveyor 39.

In the form of cooking apparatus shown in FIGURE 18 a steam manifold 44$^a$ is provided with a plurality of steam pipes 44 having valve means 44$^b$ to regulate the quantity of steam being directed upon the shrimp. For instance, if for a given species of shrimp a longer cooking period would be necessary then all of the steam pipes would be employed whereas if a shorter cooking period were necessary only a few of the pipes would be employed. The rate of linear travel of the conveyor 39 and the number of steam pipes 44 employed would regulate or control the cooking of the shrimp. It will be appreciated that this will vary with the species of shrimp since it will be quite apparent to those skilled in the art that the smaller species of shrimp will not take as long a cooking period as the larger species of shrimp.

The hood 43 is closed on each side by walls 43$^a$ and 43$^b$ and at the front and rear by walls 43$^c$ and 43$^d$. It may be also provided with a duct for ducting off excess steam thereby preventing clouding of the operating area.

When the cooked shrimp are introduced into the peeling machine the smaller diameter inserts as described hereinabove will perform a more efficient peeling operation in the upper section and by providing insert rolls in the lower section a complete peeling operation is obtained and a shirmp meat fully peeled, whole and of desired color shape characteristic is obtained.

Although I have disclosed herein the best forms of the invention known to me at this time, I reserve the right to all such modification and changes as may come within the scope of the following claims.

What is claimed is:
1. For use with a shrimp peeling machine having at least one peeling nip and water flow for lubricating and cleaning the nip, the process of preparing shrimp meat for the commercial market comprising.
   (a) subjecting shrimp in the shell to a cooking temperature, and
   (b) while the shrimp are still approximately at cooking temperature introducing the shrimp in the shell to the peeling nip, the temperature of which is below the temperature of the shrimp so that condensation forms within the shell and peeling is begun and thereafter completing the peeling of the shrimp.
2. For use with a shrimp peeling machine having at least one peeling channel and water flow for lubricating the channel and advancing the shrimp therealong, the process of preparing the shrimp meat for the commercial market comprising
   (a) subjecting shrimp in the shell to a cooking temperature, and
   (b) while the shrimp are still at approximately the cooking temperature, introducing the shrimp in the shell to the peeling channel and water flow the temperature of which is below the cooking temperature sufficient to cause condensation to form within the shell and thereafter completing the peeling of the shrimp.

References Cited by the Examiner
UNITED STATES PATENTS 2,574,044 11/1951 Lapeyre et al. _____ 17—2
3,084,379 4/1963 Henning _____ 17—45

OTHER REFERENCES

The Good Housekeeping Cook Book, 1949, pp. 292–293, Rinehart & Co., N.Y.

Higgins, E.: Article in "The Scientific Monthly," January–June 1934, page 440 relied on.

A. LOUIS MONACELL, *Primary Examiner.*

L. M. SHAPIRO, *Assistant Examiner.*